(12) United States Patent
Strathman et al.

(10) Patent No.: US 12,195,298 B2
(45) Date of Patent: Jan. 14, 2025

(54) DISPENSING MECHANISM WITH SWIVEL-AIMING FEATURE FOR REEL UTILITY

(71) Applicant: Triple C Manufacturing, Inc., Sabetha, KS (US)

(72) Inventors: Edwin J. Strathman, Bern, KS (US); Galen R. Ackerman, Sabetha, KS (US)

(73) Assignee: Triple C Manufacturing, Inc., Sabetha, KS (US)

( * ) Notice: Subject to any disclaimer, the term of this patent is extended or adjusted under 35 U.S.C. 154(b) by 0 days.

(21) Appl. No.: 18/423,832

(22) Filed: Jan. 26, 2024

(65) Prior Publication Data

US 2024/0208770 A1    Jun. 27, 2024

Related U.S. Application Data

(62) Division of application No. 17/302,290, filed on Apr. 29, 2021, now Pat. No. 11,926,503.
(Continued)

(51) Int. Cl.
*B65H 75/44* (2006.01)
*B65H 75/42* (2006.01)

(52) U.S. Cl.
CPC ....... *B65H 75/4428* (2013.01); *B65H 75/425* (2013.01); *B65H 75/4402* (2013.01);
(Continued)

(58) Field of Classification Search
CPC ............. B65H 75/4428; B65H 75/425; B65H 75/4402; B65H 75/4442; B65H 75/4463;
(Continued)

(56) References Cited

U.S. PATENT DOCUMENTS 2,679,987 A * 6/1954 Saliba ................... B65H 54/58
                                                     242/403
4,454,999 A   6/1984 Woodruff
(Continued)

OTHER PUBLICATIONS

Larson Cable Trailers, Inc., Larson Cable Trailer, More Than Just Cable Trailers, published no later than Apr. 2007, 33 pages, Larson Cable Trailers, Inc., Iroquois, South Dakota, United States.

*Primary Examiner* — William A. Rivera
(74) *Attorney, Agent, or Firm* — Coughlin Law Office LLC; Daniel J. Coughlin; Stuart M. Aller

(57) ABSTRACT

A vehicle-mounted reel utility with a cable dispenser. The cable dispenser has a swivel-aiming feature for figure 8'ing the cable. The cable dispenser is mounted to a swivel mount located at a free end of a positioning arm. The cable dispenser rotates about a pivot end of the positioning arm from a position parallel to a lifting arm to a position perpendicular to the lifting arm, and vice versa. The cable dispenser is also pivotally mounted to the swivel mount, allowing the user to swivel the cable dispenser about a horizontal arc while maintaining the cable dispenser in a central lateral position relative to a reel or a vehicle during the swivel movement. A hydraulic circuit controls the cable dispenser and an actuator that controls movement of a brake wheel from a contact to non-contact position, to coordinate the stopping of the reel and cable dispensing by the cable dispenser.

17 Claims, 9 Drawing Sheets

Related U.S. Application Data

(60) Provisional application No. 62/705,381, filed on Jun. 24, 2020.

(52) U.S. Cl.
CPC ..... *B65H 75/4442* (2013.01); *B65H 75/4463* (2013.01); *B65H 2403/7252* (2013.01)

(58) Field of Classification Search
CPC ........ B65H 2403/7252; B65H 2701/32; B65H 2701/33; B65H 49/32; B65H 51/10; B65H 59/04; B65H 75/30; B65H 49/34; B65H 49/327; B65H 57/18; B65H 49/325; B65H 49/321; B65H 49/36; B65H 75/4481; B65H 49/24; B65H 75/4478; B65H 54/74; B65H 2555/12; B65H 2555/22; B65H 54/42; B60P 3/035
See application file for complete search history.

(56) References Cited

U.S. PATENT DOCUMENTS

| | | | |
|---|---|---|---|
| 4,588,142 A * | 5/1986 | Malzacher | B65H 54/74 |
| | | | 242/397.3 |
| 5,366,171 A | 11/1994 | Kononov | |
| 6,347,761 B1 | 2/2002 | Larson | |
| 6,827,120 B2 * | 12/2004 | Last | E04H 4/101 |
| | | | 160/133 |
| 6,932,294 B1 | 8/2005 | Larson | |
| 9,290,355 B2 * | 3/2016 | Worton | B65H 49/32 |
| 9,476,269 B2 | 10/2016 | Dyck | |
| 10,106,370 B2 | 10/2018 | Reynolds | |
| 10,745,237 B2 | 8/2020 | Russell | |
| 10,787,339 B1 | 9/2020 | Alves | |
| 10,870,554 B2 * | 12/2020 | Zoske | B65H 75/4478 |
| 11,364,835 B2 | 6/2022 | Dyck | |
| 11,926,503 B2 * | 3/2024 | Ackerman | B65H 59/04 |
| 2002/0171001 A1 | 11/2002 | Hiebenthal | |
| 2009/0196723 A1 | 8/2009 | Smith | |
| 2014/0224917 A1 * | 8/2014 | Turner | |
| 2015/0158692 A1 | 6/2015 | Reynolds | |
| 2015/0292282 A1 | 10/2015 | Dyck | |
| 2018/0282108 A1 | 10/2018 | Russell et al. | |
| 2018/0282109 A1 | 10/2018 | Colleoni et al. | |
| 2020/0087102 A1 | 3/2020 | Russell et al. | |
| 2020/0369490 A1 | 11/2020 | Uccellani et al. | |
| 2021/0403276 A1 * | 12/2021 | Ackerman | B65H 75/4463 |

* cited by examiner

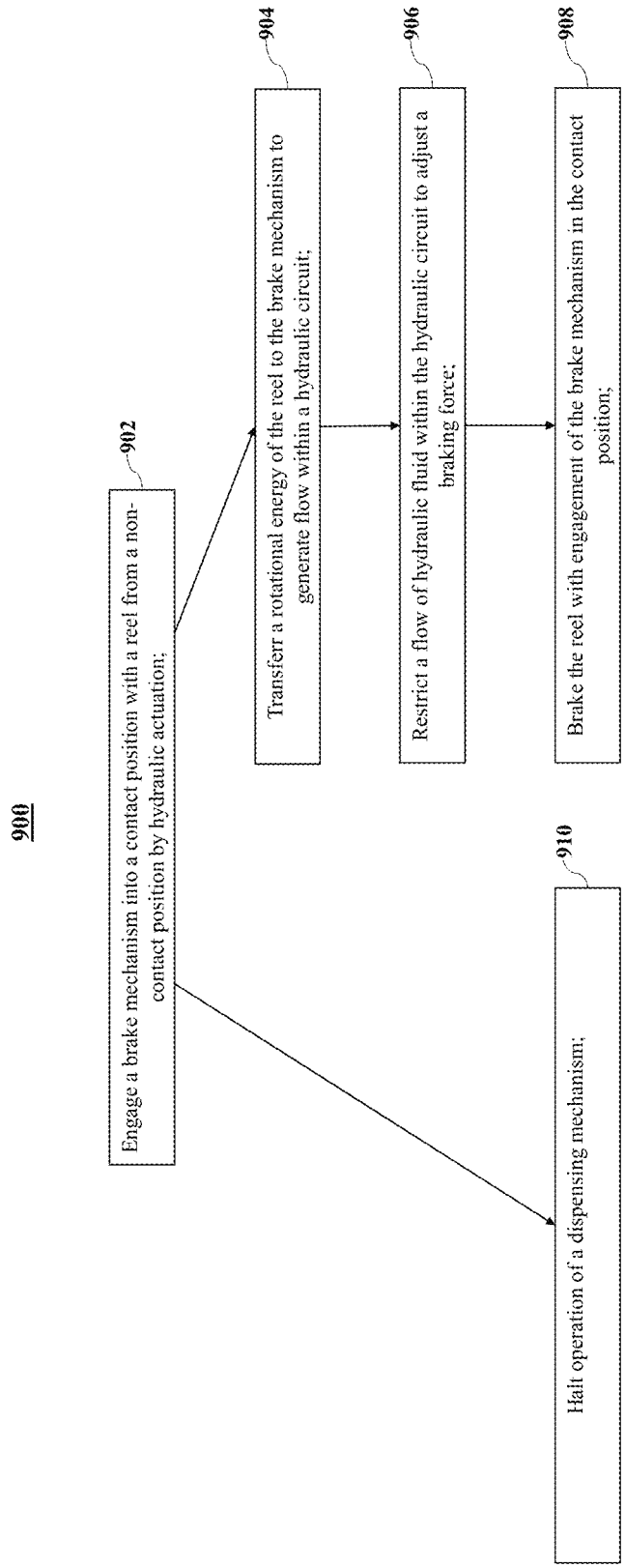

DISPENSING MECHANISM WITH SWIVEL-AIMING FEATURE FOR REEL UTILITY

CROSS REFERENCES

This application is a divisional of U.S. application Ser. No. 17/302,290, entitled "Coordinated Dynamic Braking and Swivel-Aiming Feature for Reel Utility", filed on 29 Apr. 2021, which claims the benefit of U.S. Provisional Application No. 62/705,381, entitled "Coordinated Dynamic Braking and Swivel-Aiming Feature for Reel Utility", filed on 24 Jun. 2020, which are incorporated herein by reference in their entirety.

FIELD OF THE INVENTION

The present disclosure relates to mechanisms for dispensing, stopping, and retrieving reelable materials such as cable, wire, rope or other reelable material from a reel unit. The present disclosure relates particularly to coordinating a halt to dispensing a reelable material and nearly simultaneously braking the wheel rotation. The present disclosure also relates particularly to dispensing the reelable material with a swivel feature that maintains the dispensing mechanism in a central lateral position relative to a reel or a vehicle.

BACKGROUND

Self-loading bed assemblies for flat-bed trucks are useful for adapting a truck to pick-up, transport, and then feed or off-load one or more big round bales, as shown in U.S. Pat. No. 4,564,325.

Self-loading bed assemblies can also manipulate and haul other loads such as reels of fiber optic cable, as shown in U.S. patent application Ser. No. 15/939,498. A flat-bed truck with a reel lift apparatus can lift, carry, and transport a spool or a reel unit. The reel lift apparatus can also comprise a driven wheel that engages the reel by sliding adjacent to and alongside the lifting arm to turn the reel for retrieving the reelable material. Cable reels (also known as drums or spools) containing fiber optic cables are supplied with a substantial amount of cable, such as 4-kilometers of cable.

When installing cables—such as fiber optic cables—installers encounter obstacles such as roads and rivers. To feed the cable beneath the obstacle, the terminal end of the spooled cable is obtained. The cable is dispensed to obtain the terminal end which will be the last of the cable once fully unwound. The cable may be dispensed onto the ground in a figure 8 shape. The figure-8 configuration of the dispensed cable prevents kinking or twisting of the cable when the cable is unreeled or back fed. Figure 8'ing may be performed manually or with a self-stowing cable dispenser for figure 8'ing, as shown in U.S. patent application Ser. No. 16/572,596, the disclosure of which is incorporated by reference herein. The figure 8 May prevent kinks by putting a half twist in on one side of the "8" and takes it out on the other side of the "8." Loops are commonly five feet to 12 feet in diameter. Once the terminal end is obtained, the terminal end is drawn beneath the obstacle, typically in a previously buried hollow conduit, and the reelable material is re-spooled onto the reel.

SUMMARY

We discovered that braking the reel in coordination with halting the dispensing mechanism prevents damage to the reelable material. If the dispensing mechanism and the reel are stopped at different times, then one of two situations can occur. First, if the reel is braked before the dispensing mechanism is halted, then excess pressure can be applied to the reelable material by the dispensing mechanism. Second, if the dispensing mechanism is stopped before the reel is braked, then an excess amount of reeleable material becomes unspooled (or unwound) between the reel and the dispenser which can result in tangles and breaks in the reelable material.

A hydraulic circuit is structured to pivot a brake wheel into a contact position with the reel flange perimeter to stop reel movement and simultaneously halting power to the dispensing mechanism to stop the reelable material from being unspooled. The brake wheel contacts the reel flange perimeter. The brake wheel is mounted to a pivotable brake bracket operated by a linear actuator. The pivotable brake bracket may pivot upon a trolley by hydraulic actuation. The brake bracket may also be mounted to the lifting arm and operable to move between a non-contact position adjacent to a reel supported by the lifting arm and a contact position with the reel flange perimeter through a pivot, longitudinal slide, lateral slide, or other movement of the brake wheel into the contact position. For example, the brake bracket may be selectively attached to the lifting arm assembly with a series of mounting points disposed within and across a portion of the lifting arm assembly. The brake bracket may be directly slidable upon the lifting arm, without the use of a rail. A control mechanism may be coupled to the hydraulic valve to provide forward, neutral, or reverse control of the hydraulic circuit. In the neutral state, the valve may not permit hydraulic flow through the valve. Forward and reverse relate to the direction of hydraulic fluid from the valve. The control mechanism may include an electronic servomechanism or a manual hydraulic control.

Braking of the reel may be accomplished by engaging a brake wheel under resistance. For example, a hydraulic brake motor rotationally coupled to the brake wheel can be hydraulically connected to a crossover or flow control valve to aid in the reel stop in either an instantaneous or gradient fashion. The hydraulic circuit flow rate within the brake motor slows due to resistance caused by hydraulic fluid flow around the circuit and within the flow control valve. The increased hydraulic pressure in the flow control valve causes the brake motor to generate an increased pressure of hydraulic fluid, and the resistance generated acts against and slows the momentum of the reel due to the braking of the wheel. The flow control valve may be adjustably dialed in to set the resistance to make for a stronger, quicker stop or a weaker, slower stop by controlling the hydraulic flow within the brake motor.

Some of the other advantages include:
a. rapid engagement of the brake wheel using a linear actuator for micro-positioning by moving the brake bracket after macro-positioning the brake bracket into approximate place with the trolley;
b. instantaneous brake engagement when using a relatively small, short stroke cylinder to pivotally engage the brake wheel with the reel, or alternatively with a longer stroke cylinder and a proportionally higher hydraulic pressure;
c. elimination of bunching or buckling of reel material between the dispensing mechanism and the reel, where cooperation between the dispensing mechanism and the braking of the wheel is synchronized via the hydraulic circuit; and d. gradient braking of the reel based on regulation of the hydraulic circuit flow rate in the brake motor via a flow control valve that is adjustable, such as a crossover valve.

We also disclose a swivel mount or point generally aligned vertical with and proximal to the traction point of the dispensing mechanism. The length of the cable is constant between the reel and the traction point of the dispensing mechanism. Reducing the travel arc of the traction point during the swiveling action also lessens the pull of the reel on the user operating the dispenser and may reduce stress on the reel material.

Reducing the swivel arc radius of the dispenser may reduce safety concerns for the operator and others nearby as the dispensing tube is swung around in a smaller arc compared to rotating an arm about a swivel point located at the hitch or bed horizontally away from the traction point.

Another advantage we recognized is that self-stowing of the dispensing mechanism with the lifting arm allows the dispensing mechanism to be stored in a position ready to deploy without interfering with other operations of the lifting arms or the truck bed. We also recognized that self-stowing of the dispensing mechanism parallel with the lifting arm similarly facilitates storing the dispensing mechanism in a position ready to deploy without interfering with other operations of the lifting arms or the truck bed.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed. Accordingly, the drawings and detailed description are to be regarded as illustrative in nature and not as restrictive.

BRIEF DESCRIPTION OF DRAWINGS

Details of the disclosure are illustrated by way of example, and not by way of limitation, in the accompanying drawings, wherein:

FIG. 9 depicts a flow chart for a method to simultaneously coordinate halting operations of a dispensing mechanism and braking of a reel.

DETAILED DESCRIPTION

Figure 1:
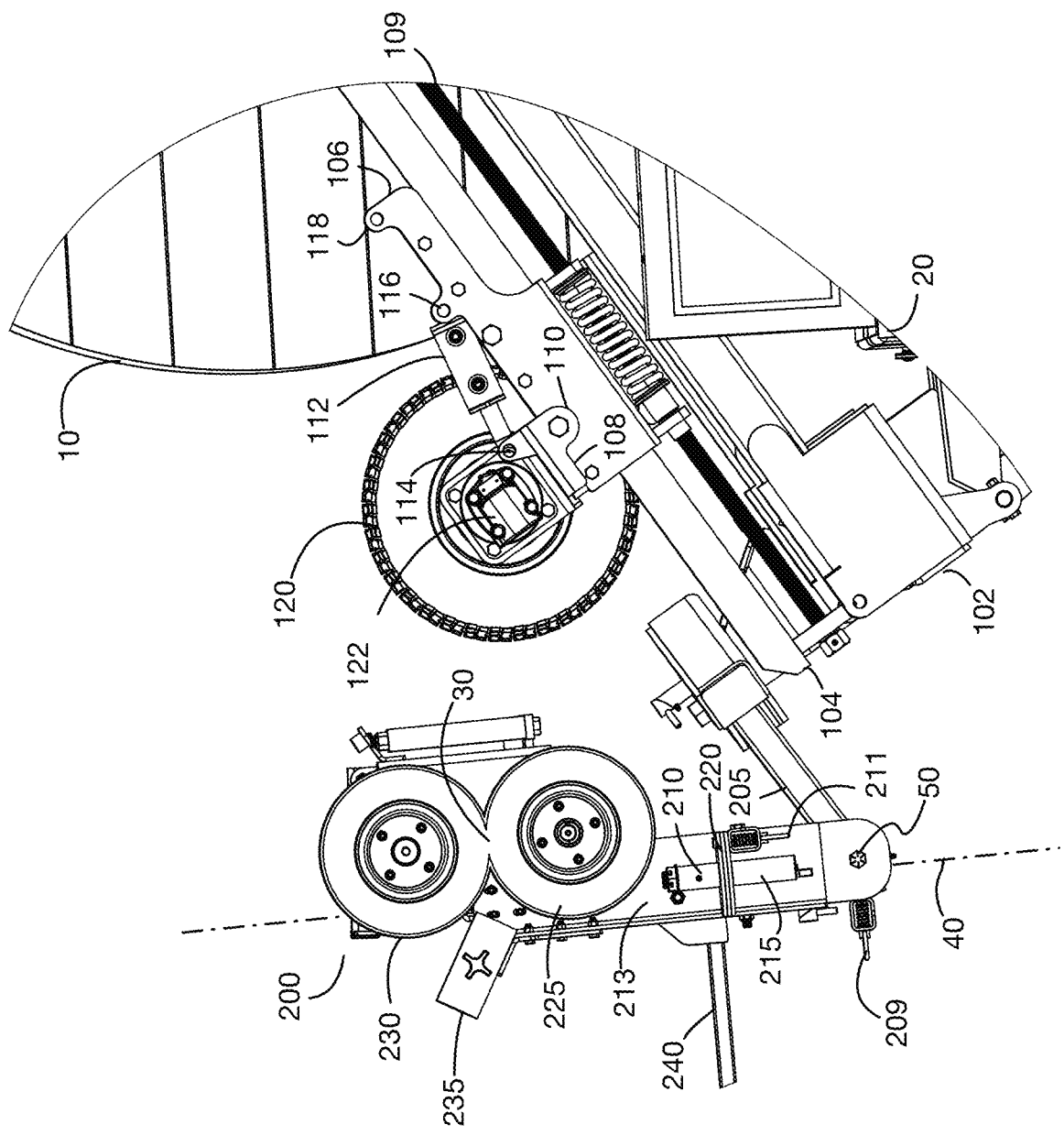
FIG. 1 depicts a side perspective view of a truck bed with a moving brake bracket, braking linear actuator, and dispensing mechanism with swivel feature.
Figure 2:
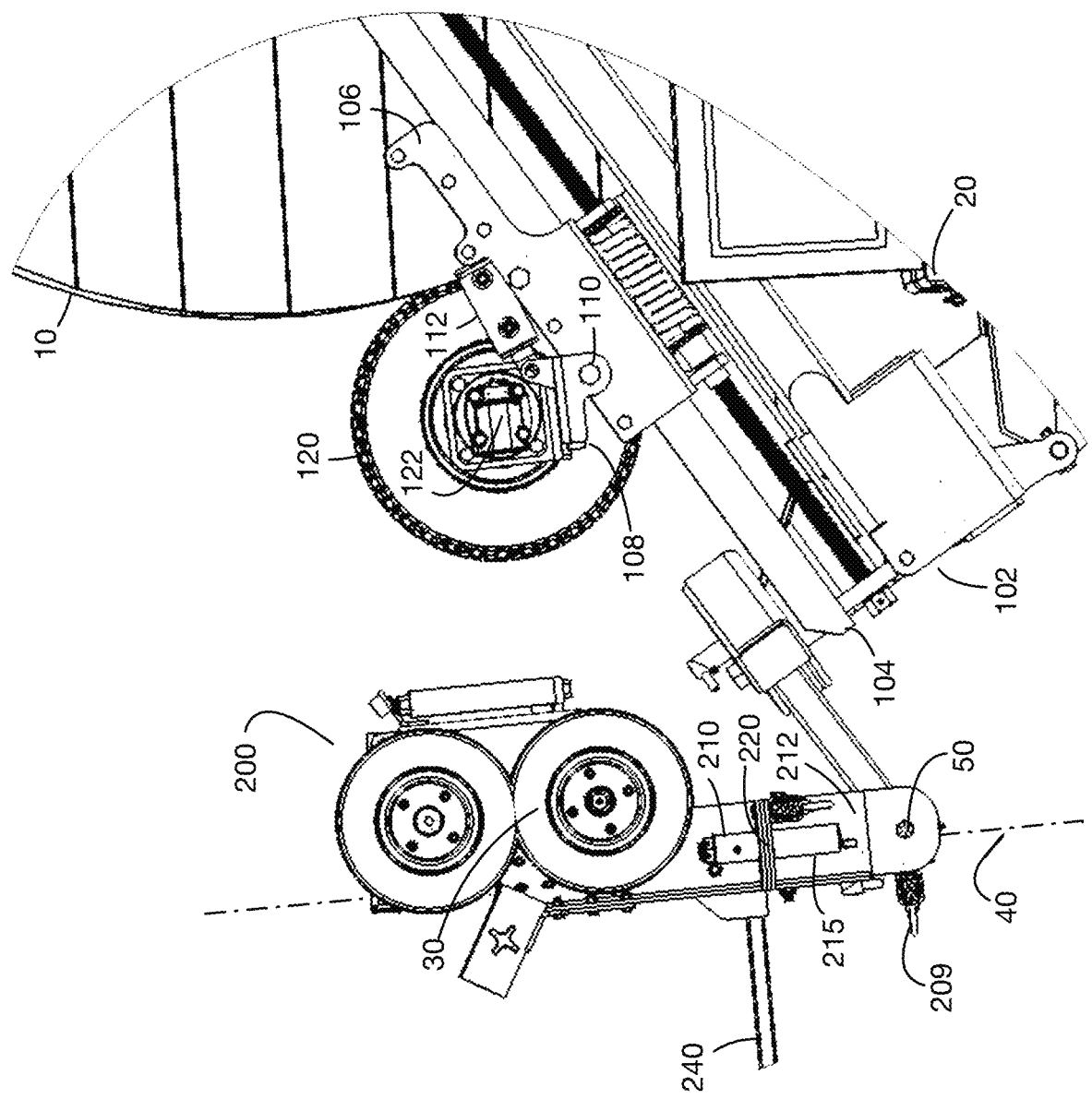
FIG. 2 depicts a side perspective view of a truck bed with the brake moved into engagement with the reel via braking from the linear actuator.

FIGS. 1 and 2 show a reel utility that is vehicle mounted. The reel utility comprises a lifting arm assembly 102 pivotally mounted to a truck bed 20 that is structured to support a reel 10. A rail 104 is mounted parallel to the lifting arm assembly 102. A trolley 106 travels upon the rail 104 along a longitudinal axis of the rail 104. A brake bracket 108 is pivotally mounted to the trolley 106. The brake bracket 108 travels with the trolley 106 along the rail 104 as driven by the linear actuator 109 causing a brake mechanism or assembly to travel up and down in the longitudinal axis of the rail 104. The brake bracket 108 pivots on a first pivot point 110 when actuated by a linear actuator 112. The brake bracket 108 contains a second pivot point 114 for attachment to the distal end of the linear actuator 112. The linear actuator 112 is hydraulically operated. A proximal end of the linear actuator 112 attaches to a distal point 116 of the trolley 106. Alternatively, the proximal end of the linear actuator 112 may be attached to a proximal point 118 of the trolley 106 to accommodate a full range of reel sizes having a diameter of up to 102 inches or down to 36 inches. When braking from the brake pivot movement is for the very smallest of reel diameter size, the brake mechanism including a brake wheel 120, a brake motor 122, the brake bracket 108, and the linear actuator 112 are positioned and mounted proximally an approximate seven inches to the proximal point 118. When braking from the brake pivot movement is for the very largest of reel diameter size, the brake mechanism is positioned and mounted distally an approximate seven inches to the distal point 116. Parts of the brake mechanism can be made of rubber, iron, steel, aluminum, or other sufficiently durable material. The linear actuator 112 moves with the brake bracket 108 and trolley 106 along the longitudinal axis of the rail 104. Linear actuator 112 selectively moves the brake wheel 120 between a non-contact and a contact position with the reel 10. Activation of the linear actuator 112 causes the brake wheel 120 to move into the contact position with the reel 10. The brake wheel 120 is also structured to slide along the longitudinal axis of the rail 104 into either the non-contact or contact position with the reel 10 supported by the lifting arm assembly 102. A brake motor 122 is mounted between the brake wheel 120 and the brake bracket 108 to engage the operation of the brake wheel 120 to rotate the reel 10 when in unspooling or retrieval modes.

Figure 3:
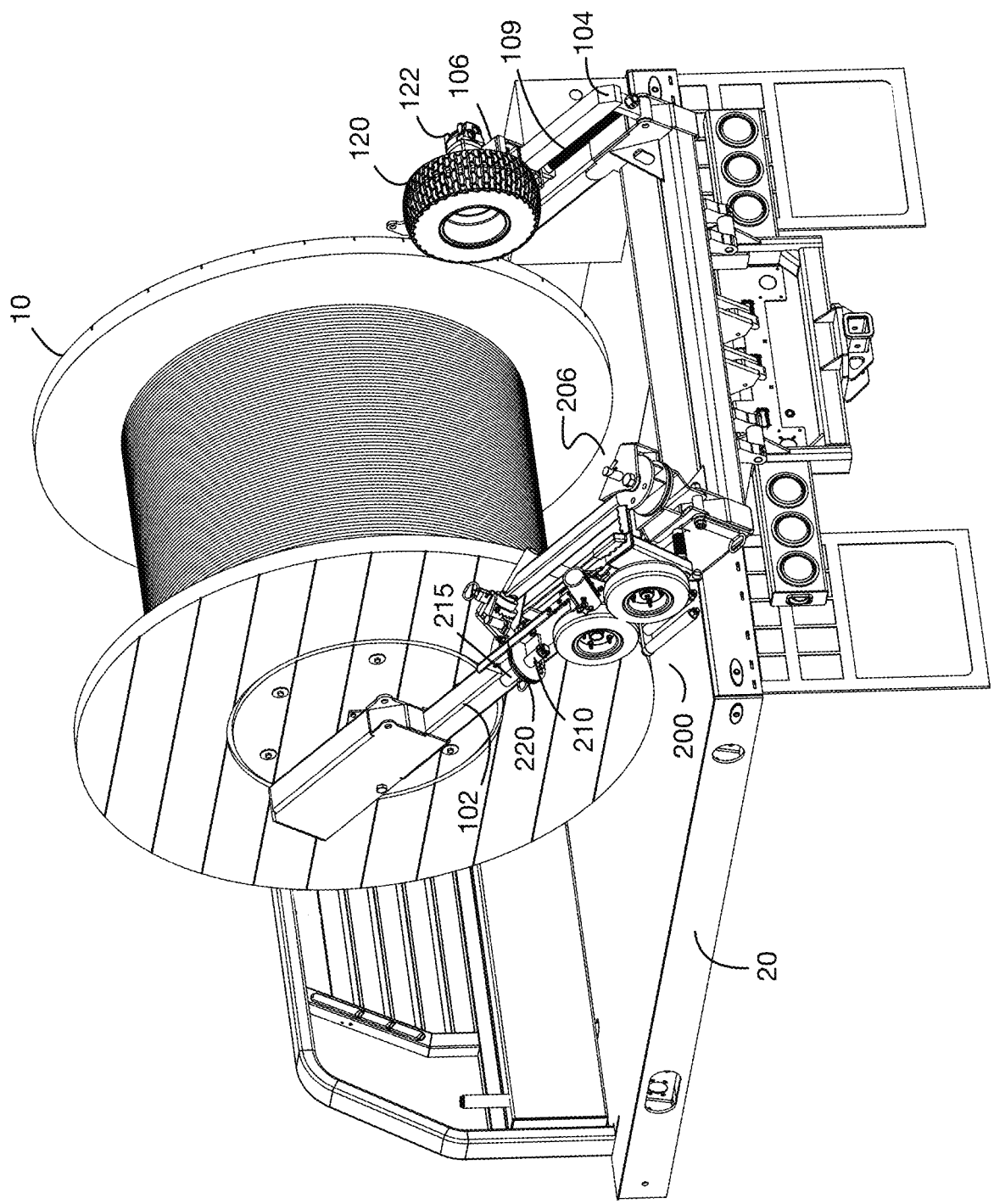
FIG. 3 depicts a side rear view of the dispensing mechanism with swivel feature in the self-stowing position.
Figure 4:
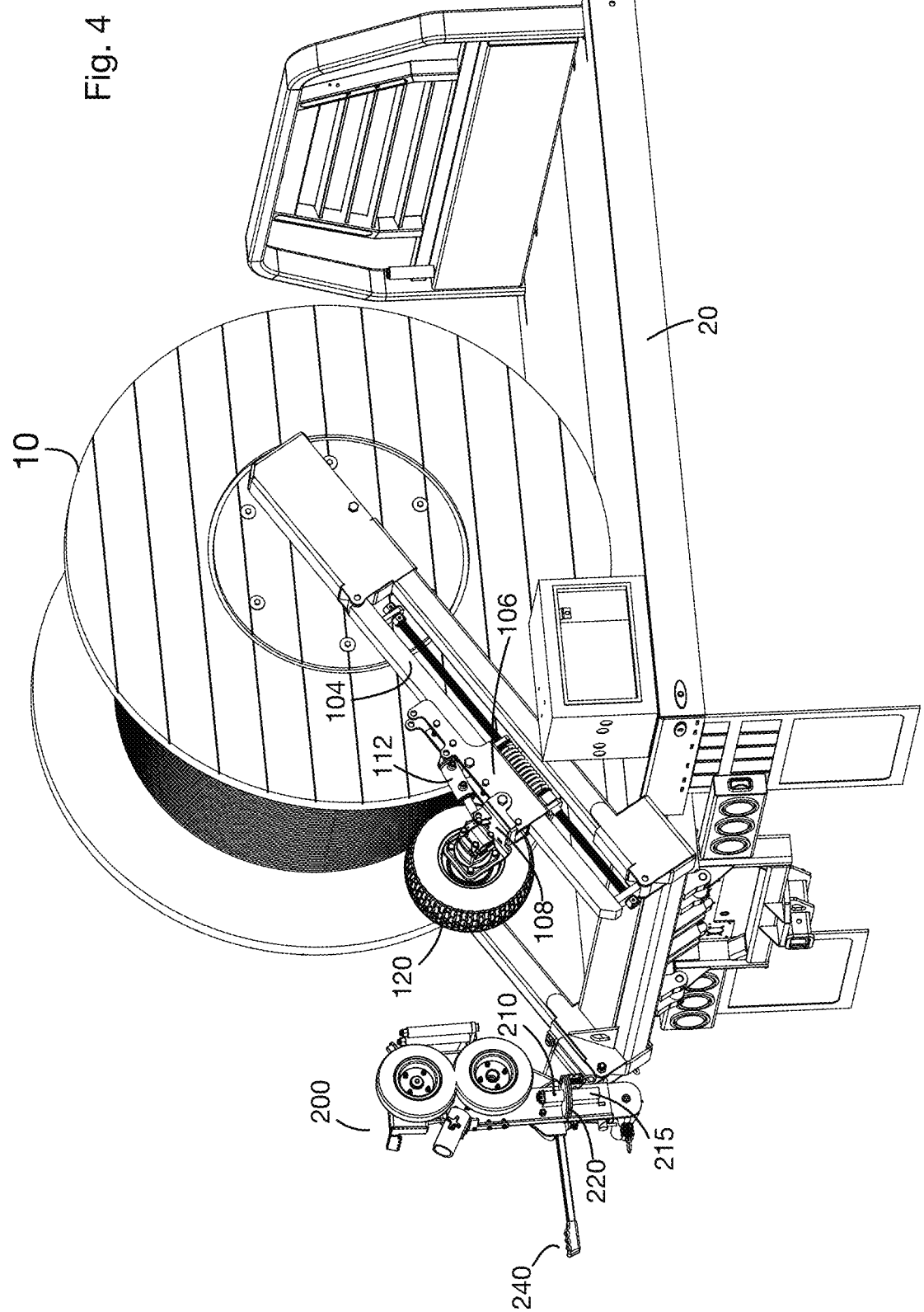
FIG. 4 depicts a side rear view of the dispensing mechanism with swivel feature in the operating position.

The lifting arm assembly 102 in FIGS. 3 and 4 is depicted as having a rectangular cross section. The lifting arm assembly 102 can have a square, rectangular, circular, or otherwise curved cross section. The lifting arm assembly 102 can be made of iron, steel, aluminum, or other sufficiently strong material. The lifting arm assembly 102 has a rail 104 upon which the trolley 106 travels.

The rail 104 in FIGS. 1 and 2 is shown mounted parallel to the longitudinal axis of the lifting arm assembly 102. The rail 104 is mounted at an offset distance from the lifting arm assembly 102. The offset is determined by the height of the mounting. The rail 104 is generally the same length of the lifting arm assembly 102. As such, the rail 104 does not take up any additional space of the truck bed 20 relative to the lifting arm assembly 102. The rail 104 in FIGS. 3 and 4 is depicted as having a rectangular cross section, such as a square iron pipe. The rail 104 can have a square, rectangular, circular, or otherwise curved cross section. The rail 104 can be made of iron, steel, aluminum, or other sufficiently strong material. The rail 104 can be removably mounted to the lifting arm assembly 102. Alternatively, the rail 104 can be directly welded to the lifting arm assembly 102.

The trolley 106 in FIGS. 1 and 2 is depicted as being slidably mounted to the respective rail 104. Alternatively, the trolley 106 can be otherwise movably mounted to the respective lifting arm assembly 102. In this way, a separate rail 104 may not be needed, and the brake wheel 120 would continue to travel alongside the respective lifting arm assembly 102. The trolley 106 would be received by the respective lifting arm assembly 102 in the same way as illustrated when received by the rail 104.

As shown in FIGS. 1 and 2, the brake bracket 108 is mounted to the trolley 106. The brake bracket 108 is shown as a rectangular 90-degree angled bracket to which the brake wheel 120 and the brake motor 122 mount. As shown in FIG. 1, the brake bracket 108 is pivotally mounted to the trolley 106 at the first pivot point 110. The brake bracket 108 is also pivotally attached to the distal end of the linear actuator 112 at the second pivot point 114. The second pivot point 114 is spaced from the first pivot point 110 in an axis generally perpendicular to the longitudinal axis of the lifting arm assembly 102. When actuated, movement of the brake bracket 108 pivots the mounted brake wheel 120 and brake motor 122 into the contact and non-contact position with the reel 10.

As shown in FIGS. 1 and 2, the trolley 106 is mounted to the rail 104. The trolley 106 is shown as a rectangular pipe. The internal dimensions of the opening in the trolley 106 correspond to the external dimensions of the rail 104. During operation, the trolley 106 receives the rail 104. The trolley 106 may be guided along the axis parallel to the longitudinal axis of the lifting arm assembly 102 by the rail 104. The trolley 106 may be structured to travel back and forth in an axis parallel to the longitudinal axis of the lifting arm assembly 102.

The linear actuator 112 shown in FIG. 1 is extended and disengaged from initiating a brake pivot action. As shown in FIG. 1, the linear actuator 112 is a small, short stroke hydraulic cylinder. Alternatively, the linear actuator 112 can be an electric actuator, acme screw, gas piston, air actuator, or the actuator could be a non-linear actuator such as a hydraulic, electric, or pneumatic rotary actuator. The reel utility has a trolley 106 upon which the linear actuator 112 is structured to move upon. The linear actuator 112 is depicted as being slidable along with the rail 104 along a longitudinal axis with the lifting arm assembly 102. Alternatively, the linear actuator 112 can be otherwise moveable on or slidable along the lifting arm assembly 102. Linear actuator 109 slides trolley 106 in a longitudinal axis along the rail 104. The trolley 106 brings the brake mechanism to the contact and the non-contact positions with the reel 10 supported by the lifting arm assembly 102. The brake mechanism comprises the brake wheel 120, the brake bracket 108, the linear actuator 112, and the brake motor 122. The brake bracket 108 pivotally connects to the trolley 106 by the first pivot point 110. The brake wheel 120 is mounted to the brake motor 122 on the brake bracket 108 that pivots upon the trolley 106 when the linear actuator 112 is hydraulically operated. The brake wheel 120 is structured to pivot when the linear actuator 112 is selectively activated. The linear actuator 112 is attached between the distal point 116 of the trolley 106 and the second pivot point 114 of the brake bracket 108. The linear actuator 112 can be structured to be hydraulically operated to selectively extend the brake wheel 120 into the non-contact position with the reel 10 mounted to the reel utility. Alternatively, the linear actuator 112 can be structured to be hydraulically operated to selectively retract the brake wheel 120 into the non-contact position with the reel 10 mounted to the reel utility.

The brake wheel 120 in FIG. 1 is shown disengaged in a non-contact position with the rim of the reel 10 by selectively extending the linear actuator 112 during operation. Alternatively, the brake wheel 120 can be disengaged with the rim of the reel 10 by reconfiguring the linear actuator 112 positionally on the trolley 106 to bring the brake wheel 120 into a non-contact position by retraction. Alternatively, the brake wheel 120 can be disengaged with the rim of the reel 10 by moving the brake wheel 120 distally along the rail 104 via the linear actuator 109. The linear actuator 109 drives the trolley 106 upon which the brake wheel 120 is attached to the brake bracket 108 via the brake motor 122. The brake bracket 108 pivotally mounted to the trolley 106 travels along a longitudinal axis of the lifting arm assembly 102. The brake bracket 108 applies the directional force supplied by the linear actuator 112 to the brake wheel 120. The brake wheel 120 mounted to the brake bracket 108 via the brake motor 122 pivots distally away from the rim of the reel 10 when the linear actuator 112 is selectively extended. The brake wheel 120 is then directed away from the reel 10 to discontinue a braking force of rotational movement on the reel 10.

It is also possible that the brake wheel 120 could be replaced with a drum, disc brake, or pulley and belt system. For example, caliper-mounted pads operated by a linear actuator could be operably connected to a hydraulic circuit to coordinate the braking of the reel 10 with the stopping of the dispensing mechanism 200. One advantage of the brake wheel 120 is the ability to use the brake wheel 120 for driving the reel 10 for retrieving the reelable material, as discussed below. A pulley and belt system could replace the brake wheel 120 to similarly engage the reel 10 in a contact position. A pulley and belt system could be configured to drive the reel 10 for retrieving reelable material, reversing the reel 10 for dispensing reelable material, as well as braking the reel 10. The brake wheel 120 may also be structured to contact the reel 10 during dispensing, with the circuit connected to the hydraulic motor operating with or without restriction. To coordinate the application of a braking force upon the reel 10 by the brake wheel 120 with the stopping of the dispensing mechanism 200, the hydraulic circuit would restrict the flow of the hydraulic fluid within the circuit connected to the hydraulic motor 122 connected to the brake wheel 120 at the same time as the dispensing mechanism 200 is stopped.

FIG. 2 shows the linear actuator 112 hydraulically activating the brake wheel 120 in the contact or braking position with a reel 10 mounted to the reel utility. The linear actuator 112 is structured to be hydraulically operated to selectively bring the brake wheel 120 into the contact position with the reel 10 mounted to the reel utility. The linear actuator 112 contracts when activated to bring the brake wheel 120 into a contact position with the reel 10 to brake or stop reel movement. Alternatively, the linear actuator 112 can be positioned so that the brake bracket 108 pivots upon the trolley 106 to force the brake into a contact position with the reel 10 to brake or stop reel movement when the linear actuator 112 is mounted in a reverse configuration and extended with a crossover in the second circuit of the multiple hydraulic circuit 300.

In FIG. 2 the brake wheel 120 is shown engaged with the rim of the reel 10 by selectively contracting the linear actuator 112 during operation. Alternatively, the brake wheel 120 can be engaged with the rim of the reel 10 by reconfiguring the linear actuator 112 positionally to extend and push the brake wheel 120 into a contact position. Alternatively, the brake wheel 120 can be engaged with the rim of the reel 10 by moving the brake wheel 120 proximally along the rail 104 via the linear actuator 109. The linear actuator 109 drives the trolley 106 upon which the brake wheel 120 is attached by the brake bracket 108 via the brake motor 122. The brake bracket 108, pivotally mounted to the trolley 106, travels along a longitudinal axis of the lifting arm assembly 102. The brake bracket 108 applies the directional force supplied by the linear actuator 112 to the brake wheel 120. The brake wheel 120 mounted to the brake bracket 108 via the brake motor 122 pivots proximally towards the rim of the reel 10 upon the trolley 106 when the linear actuator 112 is selectively retracted. The brake wheel 120 then directs a braking force upon the reel 10 to stop reel rotation.

FIG. 3 shows the dispensing mechanism 200 in the stored position. The dispensing mechanism 200 is self-stowing inline with the lifting arm assembly 102 for fast deployment when the reel material needs to be dispensed as shown in FIG. 4. In FIG. 3, the reel 10 is oriented in a stored position and rests on the truck bed 20. The self-stowing mechanism is described in greater detail in U.S. patent application Ser. No. 16/572,596, which is incorporated herein by reference.

Figure 7:
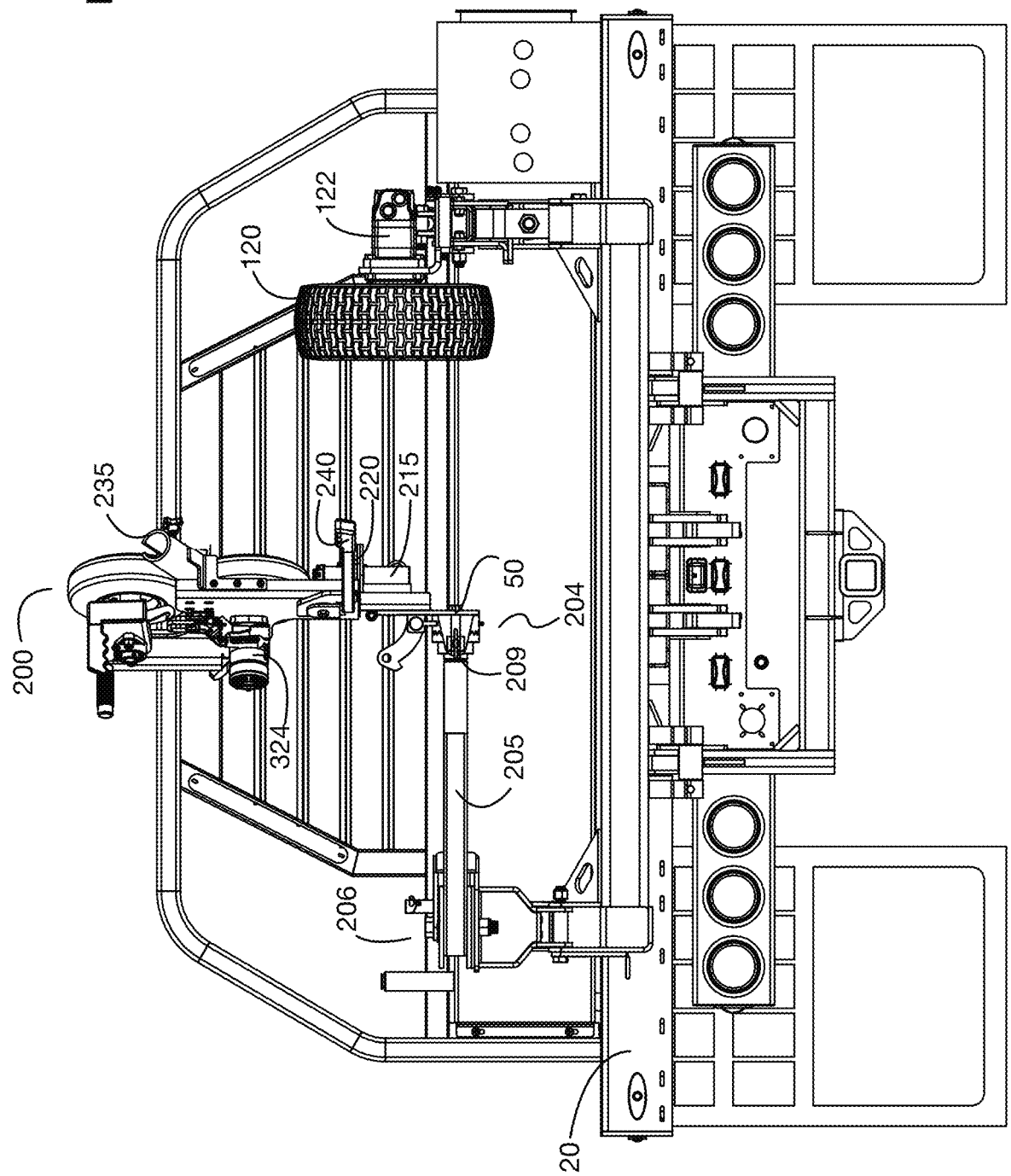
FIG. 7 depicts a rear view of the dispensing mechanism showing swivel action of the swivel feature in a right lateral direction.
Figure 8:
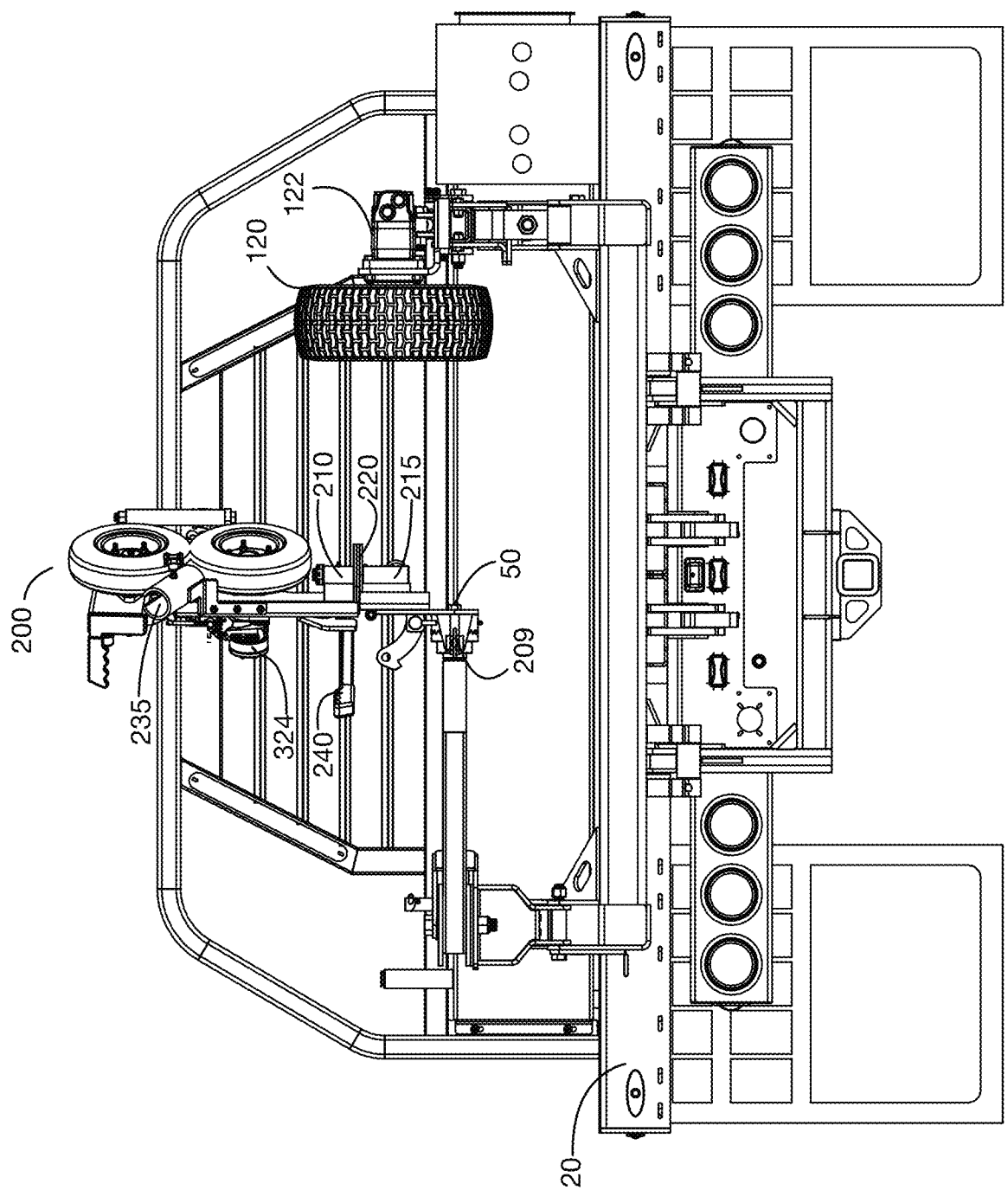
FIG. 8 depicts a rear view of the dispensing mechanism showing swivel action of the swivel feature in a left lateral direction.

FIG. 4 shows the dispensing mechanism 200 in the operating position. The dispensing mechanism 200 comprises a positioning arm 205 (shown in FIGS. 1, 7, and 8) that may be mounted to the rail 104 or the lifting arm assembly 102. The positioning arm 205 supports the dispensing mechanism 200. The positioning arm 205 mounts the dispensing mechanism 200 at the distal end of the positioning arm 205 with a rod 210 and a sleeve 215 conjunction. The positioning arm 205 is structured to position the dispensing mechanism 200 to a lateral center of the mounted reel 10, spaced from the reel 10 along the longitudinal axis of the vehicle. The dispensing mechanism 200 is attached to the positioning arm 205 by a supporting rod 210. The rod 210 is received by the sleeve 215 and supports the dispensing mechanism 200. The sleeve 215 is disposed at the free moving distal end of the positioning arm 205. The supporting rod 210 and sleeve 215 function as a swivel point or swivel mount 220. The swivel mount 220 on the dispensing mechanism 200 is structured to allow the dispensing mechanism 200 to swivel about a generally vertical axis 40 located at a distal end of the positioning arm 205. The swivel movement causes a tube 235 on the dispensing mechanism 200 to move horizontally in an arc as depicted in FIGS. 7 and 8. The swivel motion aids the operator in creating the figure '8' of the reel material. The swivel mount 220 can comprise alternative swivel mounts, such as a ball and socket, hinge, or other pivot joints that allow for pivoting about a vertical axis 40. The dispensing mechanism 200 comprises a driven wheel 225 and an idler wheel 230, where the two wheels work in concert with one another as the reel material passes therebetween. It is anticipated that both the driven wheel 225 and the idler wheel 230 could be driven in an alternative operation. The reel material is directed through the dispensing tube 235 to fall by the force of gravity to the surface. An extension (not shown) to the dispensing tube may be employed to extend the guidance of the dispenser. The fall of the reel material is directed by manual operation of a swivel handle 240 attached to the dispensing mechanism 200.

Figure 5:
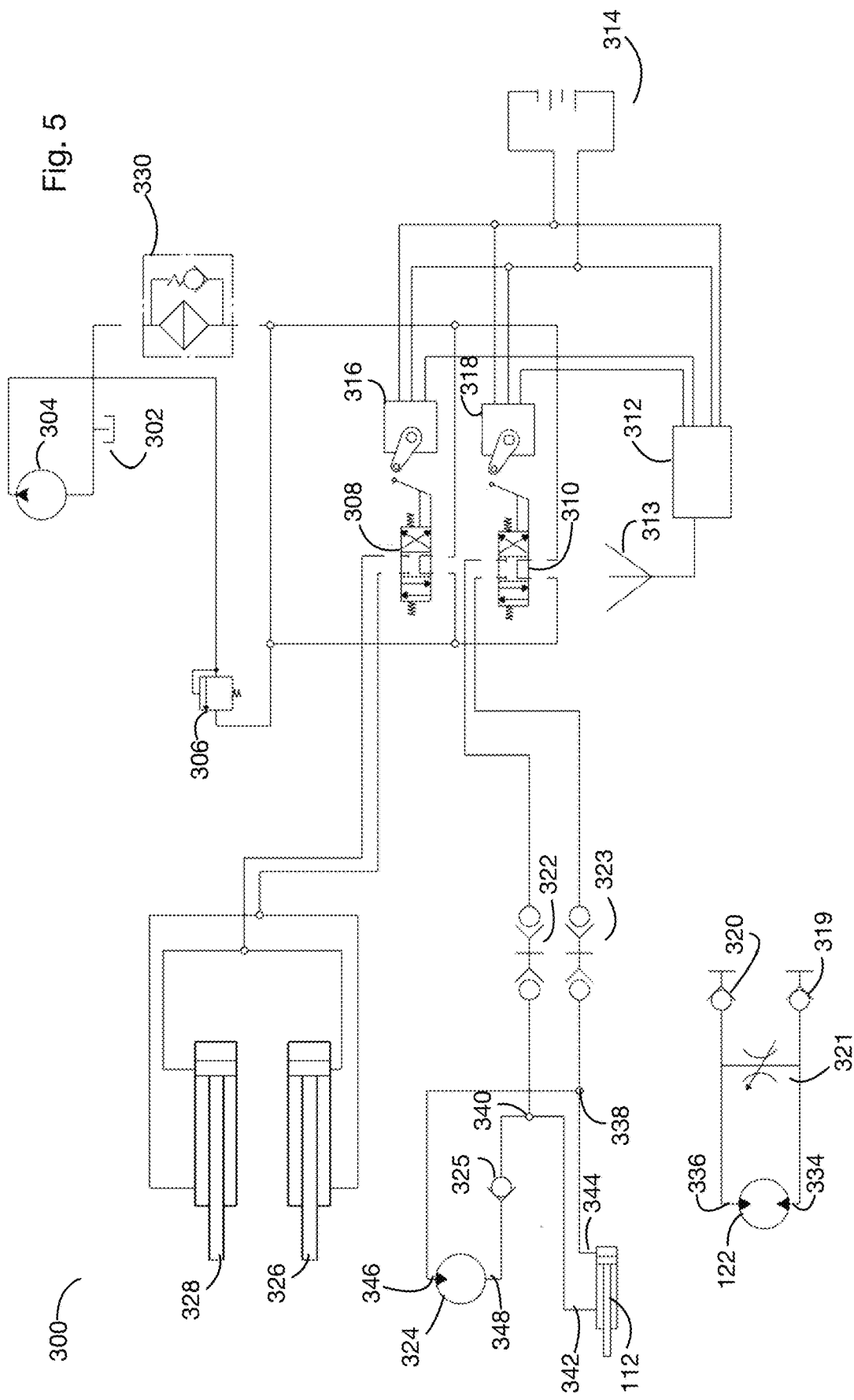
FIG. 5 depicts a multiple hydraulic circuit under wireless controller and hardwired formats for manual and electric control of the brake motor, linear actuator, and motor of the dispensing mechanism.

FIG. 5 shows a schematic of a multiple hydraulic circuit 300 structured to be simultaneously or alternately controlled by a wired controller, wireless controller, and manual operation. As shown in FIG. 5, a first circuit of the multiple hydraulic circuit 300 is operated by a lifting arm valve 308 and a second circuit of the multiple hydraulic circuit 300 is operated by a coordinating valve 310. The first circuit controls the lifting arms of the lifting arm assembly 102 through a first main cylinder 326 and a second main cylinder 328. The second circuit controls the pivot position of the brake wheel 120 by the linear actuator 112 and operation of the dispenser motor 324 of the dispensing mechanism 200. As discussed above, the linear actuator 112 and the dispensing mechanism 200 may be operated using a variety of power sources, and the control system implemented would be appropriate for the selected power source 314 and structured for simultaneous control, which would include electric circuits, gear mechanisms, piston systems, or pneumatic manifolds and valves.

As shown in FIG. 5, the brake motor 122 can operate disconnected from the pump 304. As illustrated, the brake motor 122 operates for braking purposes on a closed hydraulic loop with the capability to quick couple to the multiple hydraulic circuit 300 to become powered by hydraulic pressure from the pump 304 for dispensing or retrieval purposes. The brake motor 122 can operate as a brake decoupled from the multiple hydraulic circuit 300 to become unpowered by the multiple hydraulic circuit 300. The brake motor 122 becomes independent of the multiple hydraulic circuit 300 when not connected to a first quick coupler 319 and second quick coupler 320. At that point, the brake wheel 120 is on a closed hydraulic loop or an independent circuit. A flow control valve 321 integrated into this closed hydraulic loop allows for gradient braking of the brake motor 122 when the brake wheel 120 is in a contact position engaging the reel 10. The flow control valve 321 can be an adjustable flow control valve such as the DV-12-01.5/12-S by Hydac Technology Corp. The flow control valve 321 is operable to provide greater or less braking force by increasing or decreasing the resistance to rotation by limiting the rate of hydraulic flow within the flow control valve 321. The flow control valve 321 may be adjusted electronically, pneumatically, or electronically and such adjustments may be made directly to the valve or remotely. The flow control valve 321 may be adjusted during and outside of operation. The flow control valve 321 can be dialed in to increase or decrease the closed hydraulic loop flow rate by opening or closing the orifice the hydraulic fluid passes through. When the orifice opening in the flow control valve 321 is restricted there is more resistance to the rotation of the brake wheel 120 based on the restricted hydraulic flow rate. When the brake motor 122 is coupled to the brake wheel 120, centripetal motion of the reel 10, due to inertia, causes the brake motor 122 to become a type of hydraulic pump when the brake wheel 120 is in the contact position with the rim of the reel 10. The brake motor 122 causes hydraulic fluid to flow through the closed hydraulic loop when the motor is turned by the reel 10. The flow control valve 321 restricts the flow of hydraulic fluid from a first outlet 336 of the brake motor 122 and restricts the flow of hydraulic fluid into a first inlet 334 of the brake motor 122. The integrated flow control valve 321 in the closed hydraulic loop adds restriction and reduces the hydraulic fluid flow when the orifice opening is dialed in. Adjustments to the flow control valve 321, during or outside of operation, may increase or decrease the hydraulic loop flow rate from the first outlet 336 to the first inlet 334 of the brake motor 122. The inertial transfer of rotational energy from the reel 10 to the brake wheel 120 that is in contact with the reel 10 causes resistance to the brake wheel 120 rotation thereby providing quicker and harder braking to the reel 10.

FIG. 5 shows a diagram of the multiple hydraulic circuit 300 wherein the multiple hydraulic circuit 300 controls the pivot position of the brake wheel 120 and the operation of the dispensing mechanism 200 using the second circuit on a control mechanism 318. The second circuit encompasses the linear actuator 112 and the dispenser motor 324 of the dispensing mechanism 200. Since the linear actuator 112 and the dispenser motor 324 are on the same circuit with the coordinating valve 310, simultaneous engagement of the mechanisms occurs. For simultaneous engagement to occur, a reservoir 302 is fluidly connected to the pump 304. The pump 304 may be a fixed displacement pump. A variable displacement pump may also be used. An oil filter head 330 is fluidly connected upstream of the reservoir 302. The pump 304 generates a pressurized flow of hydraulic fluid, which is directed and utilized for various work. The pressure relief valve 306 protects the system from over pressurization. The pressurized flow of hydraulic fluid is available to the coordinating valve 310 that controls the flow of pressurized hydraulic fluid to the linear actuator 112 and the dispenser motor 324. When the coordinating valve 310 is in an operating position, the hydraulic fluid flows through a fourth quick coupler 323 and an operating interconnect 338 to operate the linear actuator 112 via an actuator extending inlet 344 and the dispenser motor 324 via a dispenser operating input 346 and a dispenser operating output 348. In an auxiliary position, the hydraulic fluid flows through a third quick coupler 322 and an auxiliary interconnect 340 to operate the linear actuator 112 via an actuator retracting inlet 342 and bypasses the dispenser motor 324 due to being blocked from fee flow by a one-way check valve 325. The coordinating valve 310 may be controlled by mechanical linkage with an electronic servomechanism as the control mechanism 316. The control mechanism 316 controls the pivot position of the brake wheel 120 by the linear actuator 112 and the dispenser motor 324 of the dispensing mechanism 200 simultaneously. This simultaneous action stops the reel material from being dispensed at the dispenser motor 324 as the linear actuator 112 rotates the brake bracket 108 into the contact position, thereby preventing buckling or bunching of the reelable material between the traction point 30 of the dispensing mechanism 200 and the reel 10. In addition, operation of the multiple hydraulic circuit 300 controls can engage the linear actuator 112 to rewind reel material onto the reel 10 with engagement of the brake wheel 120 after cable has been unwound onto the ground using figure 8'ing.

Figure 6:
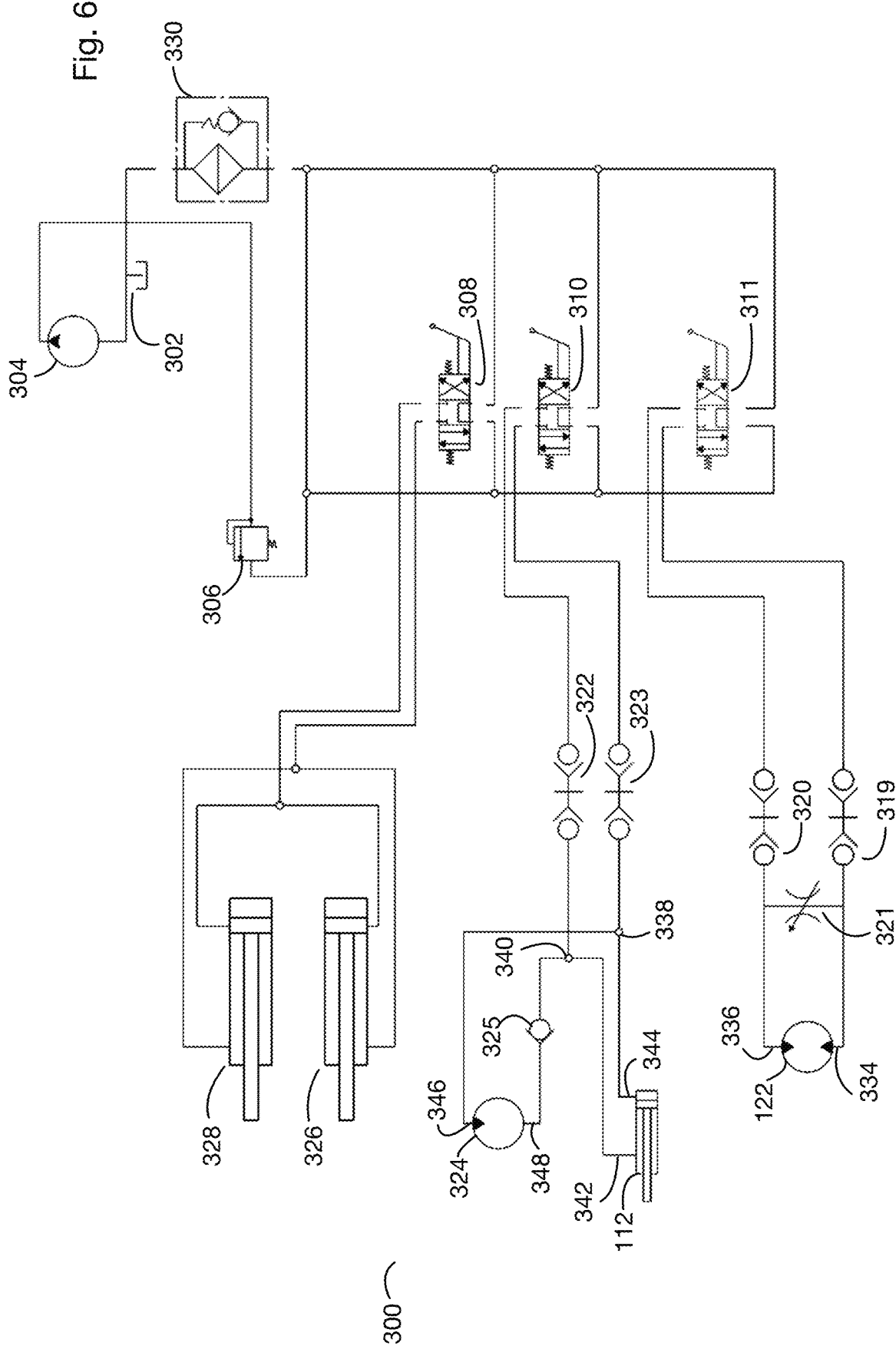
FIG. 6 depicts an alternative to the multiple hydraulic circuit under wireless and hardwired formats for manual and electric control of the brake motor, linear actuator, and motor of the dispensing mechanism.

The multiple hydraulic circuit 300 shown in FIGS. 5 and 6 also comprise an electric circuit for electronic and wireless control of the proportional hydraulic valves. The power source 314 can be a 12-volt battery operably connected to provide power to the controller 312. The power source 314 may be a vehicle battery or a supplemental battery or other suitable electric power source. The controller 312 is operably connected to the control mechanism 316, 318. The controller 312 may also be operably connected to a wireless antenna 313. The wireless antenna 313 can comprise Bluetooth, radio frequency (RF), infrared (IR), or other wireless control signals for simultaneous operation of the linear actuator 112 and the dispensing mechanism 200 and for control of the lifting arms of the lifting arm assembly 102. Alternatively, the multiple hydraulic circuit 300 can be manually operated with or without the electric circuit elements.

FIG. 6 shows a diagram of the multiple hydraulic circuit 300 structured to be controlled in the manual operation mode. The multiple hydraulic circuit 300 can also be structured to be simultaneously or alternately controlled by wireless and hardwired operating formats. As shown in FIG. 6, the multiple hydraulic circuit 300 is structured so that the brake motor 122 can be quick coupled in a third circuit of the multiple hydraulic circuit 300. The brake motor 122 is thereby hydraulically connected on an open hydraulic loop to the multiple hydraulic circuit 300 via the hydraulic valve 311. This configuration allows the brake motor 122 to operatively engage and rotate the reel 10 via the brake wheel 120 to dispense or retrieve reelable material. In the unengaged configuration, the brake wheel 120 is located near the distal end of the rail 104. In the engaged configuration, the brake wheel 120 may be actuated in the contact position by the linear actuator 112 to brake and stop the reel 10 when the hydraulic valve 311 is placed in the stop or neutral position. When the hydraulic valve 311 is in the stop or neutral position the work ports of the hydraulic valve 311 are blocked thereby deadheading or preventing hydraulic flow within the third circuit of the multiple hydraulic circuit 300.

FIGS. 7 and 8 depict the rear end of a truck bed 20 with the dispensing mechanism 200 in operation with a swivel action from left to right. The positioning arm 205 is swung to the lateral center of the mounted reel 10, distally spaced from the reel 10 along the longitudinal axis of the vehicle. The operator dispenses reelable material by operating the swivel handle 240 of the dispensing mechanism 200. The reelable material is dispensed out the tube 235 of the dispensing mechanism 200. To dispense reelable material onto the surface in the figure '8' pattern, the dispensing mechanism 200 swivels while maintaining a central lateral position relative to a reel 10 or a vehicle during the movement of the dispensing mechanism 200 from left to right. The reelable material can be manipulated in a swivel action from left to right or right to left while maintaining the dispensing mechanism 200 within the central lateral position relative to the reel 10 or vehicle. The swivel action relies on a swivel feature assembly comprising the rod 210, the sleeve 215, and the swivel mount 220. The swivel feature allows the operator to stand in one location while operating the swivel action. This is easier on the operator than having to move with the dispensing mechanism 200 in a wide arc of lateral movement. An entrance of the tube 235 may be vertically aligned near the vertical axis 40 of the swivel mount 220.

Best shown in FIGS. 1, 2, 7 and 8, the sleeve 215 is supported by a lower supporting member 212. The rod is supported by an upper supporting member 213. The upper supporting member 213 may support the dispensing mechanism 200. A swivel interlock 211 may be inserted into a coordinating slot (not shown) of the swivel mount 220 to prevent rotation of the rod 210 within the sleeve 215 while the dispensing mechanism 200 is in a stowed configuration. The swivel interlock 211 may be released from the swivel mount 220 to allow a swivel action from left to right or right to left by the dispensing mechanism 200 via the operation of the handle 240. The swivel action occurs while maintaining the dispensing mechanism 200 within the central lateral position relative to the reel 10 or vehicle. A third pivot point 50 is disposed through the lower supporting member 212 and a free end 204 of the positioning arm 205. The third pivot point 50 allows for rotation of the dispensing mechanism 200 about a horizontal axis generally parallel with an axis of rotation of the reel 10. A deployment interlock 209 may be disposed into a coordinating slot (not shown) of the lower supporting member 212 and the free end 204 of the positioning arm 205. The dispensing mechanism 200 may be positioned into a generally vertical axis 40 relative to a horizontal plane of the surface of the truck bed 20 for operation purposes. The deployment interlock 209 may be released to allow the dispensing mechanism 200 to be rotated into a stowage configuration parallel with the positioning arm 205. The positioning arm 205 may be rotated about a pivot end 206 into a stowage configuration parallel with the lifting arm assembly 102 as shown in FIG. 3.

A method 900 for simultaneously braking a reel 10 and halting operation of a dispensing mechanism 200 is shown in FIG. 9. The brake mechanism may be positioned into a non-contact position adjacent to the reel 10, as shown by way of example in FIG. 1. The brake mechanism may be engaged, rapidly, into a contact position with the reel 10, according to step 902. Optionally, a brake wheel 120 of the brake mechanism may be brought into the contact position by hydraulic actuation of the linear actuator 112, as shown by way of example in FIG. 2. Rotational energy of the reel 10 transfers to the brake mechanism to generate flow within a hydraulic circuit that may be connected or disconnected from a pump 304, according to step 904. Optionally, a brake wheel 120 of the brake mechanism may be selectively contacted with a rim or edge of the reel 10 for the transfer of the rotational energy. The flow of hydraulic fluid is restricted within the hydraulic circuit to adjust a braking force, according to step 906. Optionally, the flow of hydraulic fluid within the hydraulic circuit may be restricted, variably, with a crossover or an adjustable flow control valve 321. The flow control valve 321 may be disposed within a closed loop of the hydraulic circuit. The braking of the reel 10 by engagement of the brake mechanism in the contact position, according to step 908, may be coordinated, simultaneously, with stopping of the dispensing mechanism 200, according to step 910. The linear actuator 112 and the dispenser motor 324 of the dispensing mechanism 200 may be on the same hydraulic circuit of the multiple hydraulic circuit 300.

It is understood that other embodiments will become readily apparent to those skilled in the art from the following detailed description, wherein various embodiments are shown and described by way of illustration only. As will be realized, the concepts are capable of other and different embodiments and their several details are capable of other and different embodiments and their several details are capable of modification in various other respects, all without departing from the spirit and scope of what is claimed. Accordingly, the drawings and detailed description are to be regarded as illustrative in nature and not as restrictive.

All patent applications, patents, and printed publications cited herein are incorporated herein by reference in the entireties, except for any definitions, subject matter disclaimers or disavowals, and except to the extent that the incorporated material is inconsistent with the express disclosure herein, in which case the language in this disclosure controls.

We claim:
1. A reel utility comprising:
   a. a means for braking;
   b. an actuator that is hydraulically operated and operable to move the means for braking between a non-contact position and a contact position;
   c. a swivel mount;
   d. a dispensing mechanism, wherein the dispensing mechanism is mounted to the swivel mount and swivels on the swivel mount around a vertical axis while maintaining a central lateral position relative to a reel mounted to the reel utility; and
   e. a hydraulic circuit operable to simultaneously actuate the actuator and halt operation of the dispensing mechanism.
2. The reel utility of claim 1, further comprising:
   a. a closed hydraulic loop connecting the means for braking with a flow control valve.
3. The reel utility of claim 1, further comprising:
   a. an interlock structured to release from the swivel mount to allow the dispensing mechanism to swivel.
4. The reel utility of claim 1, wherein the swivel mount is vertically aligned and disposed under a traction point where the dispensing mechanism is structured to pull a reelable material.
5. The reel utility of claim 1, wherein the dispensing mechanism swivels while maintaining a constant length of a reelable material between the reel and the dispensing mechanism.
6. A reel utility comprising:
   a. a means for braking;
   b. an actuator that is hydraulically operated and operable to move the means for braking between a non-contact position and a contact position;
   c. a dispensing mechanism;
   d. a positioning arm comprising:
      i. a free end, wherein the dispensing mechanism is structured to mount to the free end;
   e. a swivel feature assembly comprising:
      i. a sleeve disposed at the free end of the positioning arm;
      ii. a supporting rod structured to be received by the sleeve and attach the dispensing mechanism to the positioning arm at the free end; and
   f. a hydraulic circuit operable to simultaneously actuate the actuator and halt operation of the dispensing mechanism.
7. A reel utility comprising:
   a. a swivel mount;
   b. a dispensing mechanism mounted to the swivel mount; and
   c. wherein the dispensing mechanism swivels on the swivel mount around a vertical axis while maintaining a central lateral position relative to a reel mounted to the reel utility.
8. The reel utility of claim 7, wherein the dispensing mechanism swivels while maintaining a constant length of a reelable material between the reel and the dispensing mechanism.
9. The reel utility of claim 7, wherein the swivel mount is vertically aligned and disposed under a traction point where the dispensing mechanism is structured to pull a reelable material.
10. The reel utility of claim 7, wherein the dispensing mechanism has a traction point disposed between the reel and the vertical axis around which the dispensing mechanism rotates.
11. The reel utility of claim 7, further comprising:
    a. a lifting arm;
    b. a positioning arm comprising:
       i. a free end;
       ii. a pivot end structured to pivot from a first position parallel with the lifting arm to at most a second position perpendicular to the lifting arm; and
       iii. wherein the swivel mount is located at the free end.

12. The reel utility of claim 11, further comprising:
a. a sleeve disposed at the free end of the positioning arm; and
b. a supporting rod structured to be received by the sleeve and attach the dispensing mechanism to the positioning arm at the free end.

13. The reel utility of claim 7, further comprising:
a. an interlock structured to release from the swivel mount to allow the dispensing mechanism to swivel.

14. The reel utility of claim 7, further comprising:
a. an actuator that is hydraulically operated;
b. a brake connected to the actuator and structured to pivot between a non-contact position and a contact position with the reel when the actuator is activated; and
c. a hydraulic circuit structured to pivot the brake into the contact position and stop operation of the dispensing mechanism.

15. The reel utility of claim 14, wherein the hydraulic circuit is structured to adjust a braking force by the brake in the contact position.

16. The reel utility of claim 14, wherein the hydraulic circuit comprises:
a. a flow control valve disposed within the hydraulic circuit.

17. The reel utility of claim 14, wherein the hydraulic circuit disconnected from a pump forms a closed hydraulic loop with the brake and a flow control valve.

* * * * *